UNITED STATES PATENT OFFICE.

JOHN GRIESHAMER, OF JACKSONVILLE, FLORIDA.

POLISH.

1,208,545. Specification of Letters Patent. Patented Dec. 12, 1916.

No Drawing. Application filed October 13, 1916. Serial No. 125,392.

*To all whom it may concern:*

Be it known that I, JOHN GRIESHAMER, a subject of the Emperor of Germany, residing at Jacksonville, in the county of Duval and State of Florida, have invented certain new and useful Improvements in Polishes; and I do hereby declare the following to be a full, clear, and exact description of the invention, such as will enable others skilled in the art to which it appertains to make and use the same.

The invention relates to a liquid polish.

The object of the present invention is to provide a liquid polish designed particularly for polishing and renewing the gloss of highly polished surfaces such as automobiles, carriages, furniture and the like and adapted also to serve as an efficient leather dressing for maintaining the leather in a soft condition and to prevent the leather from cracking.

It is also an object of the invention to provide a polishing composition of this character which will enable tar to be readily removed from vehicles and other objects even after it has become hard.

Another object of the invention is to provide a polish which will not cause a surface to pick up any more dust than if the polish were not applied to the same and which will maintain both painted and varnished surfaces in a fine condition.

The liquid polishing composition consists of a mixture of lubricating oil, linseed oil, turpentine, kerosene, neat's foot oil, glycerin, paint drier and coloring matter when desired.

In preparing the polish I prefer to use the ingredients in about the following proportions: 30% of lubricating oil, 10% of linseed oil, 15% of turpentine, 30% of kerosene, 5% of neat's foot oil, 5% of glycerin, 5% of paint drier.

Any suitable coloring material may be employed and is used in about the proportion of five drops of coloring material to a gallon of the polish.

The turpentine is first put into a suitable vessel and then the coloring material is added and then the kerosene, after which these ingredients are thoroughly mixed. The linseed oil and the other ingredients of the composition are then added and the entire mass is thoroughly mixed by stirring and allowed to stand for a couple of hours. It is then strained through a clean cheese cloth or other strainer and is ready for use.

It is preferable to employ a lubricating oil of the lightest specific gravity conveniently obtainable as the best results have been obtained from the use of such a lubricating oil.

What is claimed is:—

1. A liquid polish including lubricating oil, linseed oil, turpentine, kerosene, neat's foot oil, glycerin, and paint drier substantially in the proportions described.

2. A liquid polish including lubricating oil, linseed oil, turpentine, kerosene, neat's foot oil, glycerin, paint drier, and coloring matter substantially in the proportions described.

3. A liquid polish including lubricating oil, 30%, linseed oil 10%, turpentine 15%, kerosene 30%, neat's foot oil 5%, glycerin 5% and paint drier 5%.

In testimony whereof I affix my signature in presence of two witnesses.

JOHN GRIESHAMER.

Witnesses:
 ROSWELL KING,
 D. W. BROOKS.